US008750485B2

(12) United States Patent
Creamer et al.

(10) Patent No.: US 8,750,485 B2
(45) Date of Patent: Jun. 10, 2014

(54) OPERATING A CALL CENTER BASED UPON LINE INFORMATION DATABASE (LIDB) DATA

(75) Inventors: Thomas E. Creamer, Boca Raton, FL (US); Neil Katz, Parkland, FL (US); Victor S. Moore, Boynton Beach, FL (US); Scott Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1954 days.

(21) Appl. No.: 10/730,330

(22) Filed: Dec. 8, 2003

(65) Prior Publication Data

US 2005/0123123 A1  Jun. 9, 2005

(51) Int. Cl.
*H04M 3/00* (2006.01)
*H04M 5/00* (2006.01)
*H04M 7/00* (2006.01)

(52) U.S. Cl.
USPC ............ 379/265.01; 379/221.09; 379/265.05; 379/265.11; 379/265.13

(58) Field of Classification Search
USPC ............... 379/265.02, 221.11, 114.2, 265.01, 379/265.13, 88.05, 221.09, 265.11, 265.05, 379/201.02, 201.01, 207.02; 709/203; 370/254; 702/185
See application file for complete search history.

(56) References Cited

U.S. PATENT DOCUMENTS

| | | | | |
|---|---|---|---|---|
| 5,987,116 A * | 11/1999 | Petrunka et al. | ......... | 379/265.13 |
| 6,115,737 A * | 9/2000 | Ely et al. | ........................ | 709/203 |
| 6,788,649 B1 * | 9/2004 | Dugan et al. | ................... | 370/254 |
| 6,959,263 B2 * | 10/2005 | Wilson et al. | ................. | 702/185 |
| 7,043,004 B1 * | 5/2006 | Khuc et al. | ................ | 379/265.01 |
| 7,209,549 B2 * | 4/2007 | Reynolds et al. | .......... | 379/88.05 |
| 2004/0264673 A1 * | 12/2004 | Novack | ..................... | 379/221.11 |
| 2005/0078808 A1 * | 4/2005 | Winstead et al. | .......... | 379/114.2 |

OTHER PUBLICATIONS

Author Unknown, *Advanced Intelligent Networks: Opportunities in Network Control for the Coming Decade (Sample)*, Global Information, Inc. (visited Nov. 2, 2003) <http://www.gii.co.jp/english/ci2749_intelligentnetworks_summary.html>.
Zeichick, Alan, *Signaling System 7*, Control Your IT Environment (visited Nov. 4, 2003) <http://www.networkmagazine.com/shared/printableArticle.jhtml?articleID=8702253>.
Author Unknown, *LIDB Access and Transport*, Telecommunication Services, LIDB Access and Transport-VeriSign Inc. (visited Oct. 13, 2003) <http://www.verisign.com/telecom/products/database/lidbTransport.html>.
O'Doherty,Phelim, *Jain Slee Principles*, (May 2003) Motivation Behind the JAIN SLEE Specification (visited on Oct. 13, 2003) <http://java.sun.com/products/jain/article_slee_principles.html>.

(Continued)

*Primary Examiner* — Thjuan K Addy
(74) *Attorney, Agent, or Firm* — Steven M. Greenberg, Esq.; CRGO Law

(57) ABSTRACT

A method, system and apparatus for processing a call in a call center using information stored in the LIDB. A call center which has been configured in accordance with a preferred aspect of the present invention can include at least one phone handset coupled to a gateway to a PSTN. An enterprise application can be associated with the handset and a data terminal coupled to the enterprise application. A view to the enterprise application further can be disposed in proximity to the handset. A database of caller information can be coupled to the enterprise application. Each record in the database can have a configuration for location based upon a searching key.

17 Claims, 3 Drawing Sheets

(56) References Cited

OTHER PUBLICATIONS

Author Unknown, *Signaling Background*, Ulticom, Ulticom-SS7 signaling, SIGTRAN, SS7/1P (M2PA, M3UA, SCTP), Signaling Gateway and SIP (visited Oct. 13, 2003) <http://www.ulticom.com/html/signalingresources/signalingbackground.asp>.

Northridge, Steve, *Convergent SS7 Signaling for Seamless Service Deployment*, Ulticom, Submitted on Dec. 8, 2003.

Author Unknown, *Managing VoIP with Packet Intelligent Network Service-Achieving Operational Excellence*, SS8 Networks, Inc. Mar. 2003.

Author Unknown, *LIDB Access Service*, Verizon Wholesale Products and Services, 2000 Verizon Communications.

Author Unknown, The Parlay Group, 3$^{rd}$ Generation Partnership Project 2 "3GPP2", Submitted on Dec. 8, 2003.

* cited by examiner

OPERATING A CALL CENTER BASED UPON LINE INFORMATION DATABASE (LIDB) DATA

BACKGROUND OF THE INVENTION

1. Statement of the Technical Field

The present invention relates to the field of intelligent networks, and more particularly to the operation of a call center based upon data disposed within a line information database (LIDB) in an intelligent network.

2. Description of the Related Art

The intelligent network of today bears little semblance to the public switched telephone network (PSTN) of old. In fact, the term "intelligence" has little to do with the operation of the conventional PSTN. Rather, the PSTN of today incorporates a massive complex of switching matrices and transport trunks that, through the electronic equivalent of "brute force", forge the interconnections necessary to call completion. More particularly, for decades for every call processed the PSTN relies upon each successive switch to route a voice signal to the next. Still, today the sheer volume of calls placed through the PSTN demands a faster, more streamlined approach to call routing.

To overcome the elements of the brute force aspect of the conventional PSTN, physically separate signaling networks have been grafted upon the transport and switching PSTN elements to oversee call set-up and billing. These "out-of-band" adjuncts speed routing data and commands directly to the switches involved, establishing all the necessary links prior to the actual calls transmission. With "out-of-band" signaling, the PSTN has become "conscious" of the operations it is to perform prior to their execution. Consequently, the PSTN has become a more flexible beast, capable even of substantial logic.

The development of the "out-of-band" protocol, Signaling System 7 (SS7), has led to the widespread deployment of intelligent network technology. In SS7, signaling links transmit routing packets between switches. Consequently, specialized SS7 Signaling Transfer Points (STPs) appeared to shepherd routing messages from local switches onto a high-capacity packet switches for distribution to other switches, STPs and call-related databases, such as the Line Information Database (LIDB), Toll Free Calling database and other databases containing customer information or additional call routing instructions. And, so, the agility of high-speed computer networking began exerting control over the raw power of the PSTN.

The marriage of convenience between SS7 and the PSTN soon produced the Advanced Intelligent Network (AIN)—an architecture where centralized databases control call processing. Logic ported via STPs to select switches now have become widely distributed throughout the network. AIN-capable switches also have begun to function as interactive signaling-platforms. Equipped with resident software triggers, AIN capable switches now can halt a call in progress long enough to query Service Control Points (SCPs), databases containing service logic and subscriber information which can provide instruction as to how to route, monitor, or terminate the call. The PSTN of today now effectively includes long-term memory as well as intelligence. Accordingly, the modern local exchange carrier holds the means to deploy such advanced telecommunications features such as telephone number portability, wireless roaming, call waiting and a host of other subscriber options.

SUMMARY OF THE INVENTION

The present invention addresses the deficiencies of the art in respect to the operation of a call center and provides a novel and non-obvious method, system and apparatus for processing a call in a call center using information stored in the LIDB. A call center which has been configured in accordance with a preferred aspect of the present invention can include at least one phone handset coupled to a gateway to a PSTN. An enterprise application can be associated with the handset and a data terminal coupled to the enterprise application. A view to the enterprise application further can be disposed in proximity to the handset. A database of caller information can be coupled to the enterprise application. Each record in the database can have a configuration for location based upon a searching key.

Importantly, at least one line LIDB can be disposed in the PSTN and configured to store individual searching keys. Each of the individual searching keys can have an association with a corresponding subscriber to the PSTN. A gateway node further can be communicatively linked both to the PSTN and the enterprise application. Finally, a query interface to the enterprise application can be programmed to select records in the database of caller information based upon an individual searching key received from the LIDB through the gateway node. Notably, each of the individual searching keys can include a combination of a caller name and a caller address. Moreover, the enterprise application can include a customer relationship management application.

In a method for processing a call in a call center using information stored in an LIDB, a searching key can be retrieved from the LIDB wherein the searching key is associated with the call. An enterprise application can be queried based upon the retrieved searching key to retrieve caller data. As a result; the caller data can be presented to a call center operator processing the call. Preferably, the retrieving step can include retrieving the searching key from a gateway node disposed intermediately between the LIDB in a PSTN and the enterprise application. Moreover, the retrieving step further can include retrieving a combined name and address associated with the call from the gateway node, and passing the combined name and address to the querying step as the retrieved searching key. Where the searching key cannot be retrieved from the gateway node, however, an incomplete set of caller data can be presented.

In a PSTN, a method for processing a call in a call center using information stored in an LIDB can include, for selected ones of subscribers to the PSTN, storing within subscriber records in the LIDB a searching key into an enterprise application disposed externally to the PSTN. Subsequently, during an attempt to establish a call between a subscriber to the PSTN and the call center, a searching key corresponding to the subscriber can be retrieved from the LIDB. Once retrieved, the searching key can be forwarded to the enterprise application for use in retrieving call information stored externally to the PSTN. In particular, the searching key can be forwarded to the enterprise application via a gateway node coupled both to the enterprise application and the PSTN.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of the this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a call center operably configured to retrieve a key into a customer information database from an LIDB disposed within a PSTN. In accordance with the present invention, a call center can be coupled to a gateway node between a PSTN and a data communications network. The LIDB can be disposed within the PSTN and can be configured to store a key into a customer record stored within an enterprise data driven application coupled to the call center. In this way, when an incoming call is processed in the PSTN to connect to the call center, the key stored within the LIDB can be delivered to the call center through the gateway node with which a customer record can be retrieved for the incoming call.

Figure 1:
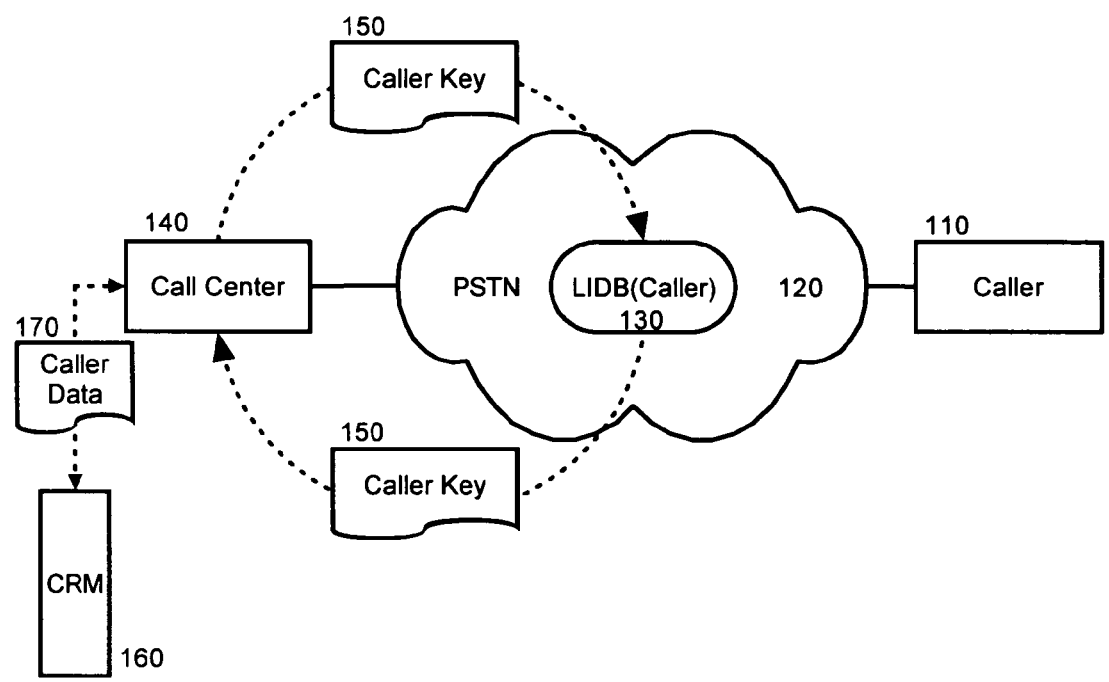
FIG. 1 is a block diagram depicting a process for utilizing an LIDB key disposed within an LIDB to retrieve customer data in a call center in accordance with the present invention.

In further illustration, FIG. 1 is a block diagram depicting a process for utilizing an LIDB key disposed within an LIDB to retrieve customer data in a call center in accordance with the present invention. As shown in FIG. 1, a caller 110 can establish a connection with a call center 140 over the PSTN 120. LIDB 130 can be disposed within the PSTN 120 and can be accessed from within the PSTN 120 to process invariant data associated with the caller 110 such as the name, address and billing information associated with the caller 110. Unlike prior art uses of a LIDB 130, however, the invariant data 150 further can include a key which can be used to access caller data 170 in an enterprise application 160. The key can include a combination of the name and address of the caller 110, a combination of other invariant data stored in hte LIDB 130, or any variable data written to the LIDB 130.

In more particular illustration, the enterprise application 160 can be a customer relationship management application deployed within the call center 140. Selected records in the customer relationship management application can be configured for retrieval based upon a unique searching key as is known in the art. Unlike prior art call center implementations, however, the searching key can be obtained through the PSTN 120 in an LIDB 130. Moreover, the searching key for a specific caller 110 can be retrieved based upon the ability of the LIDB 130 to return invariant or variable data disposed within the LIDB 130 for a caller 110 when the caller attempts to establish a call with the call center 140. The searching key can be passed to the customer relationship management application 160 for processing before the call can be established between the caller 110 and the call center 140. In this way, before the call center 140 accepts the incoming call from the caller 110, caller data 170 for the caller 110 can be retrieved for use in the call center 140 based exclusively upon the searching key retrieved from the LIDB 130.

Figure 2:
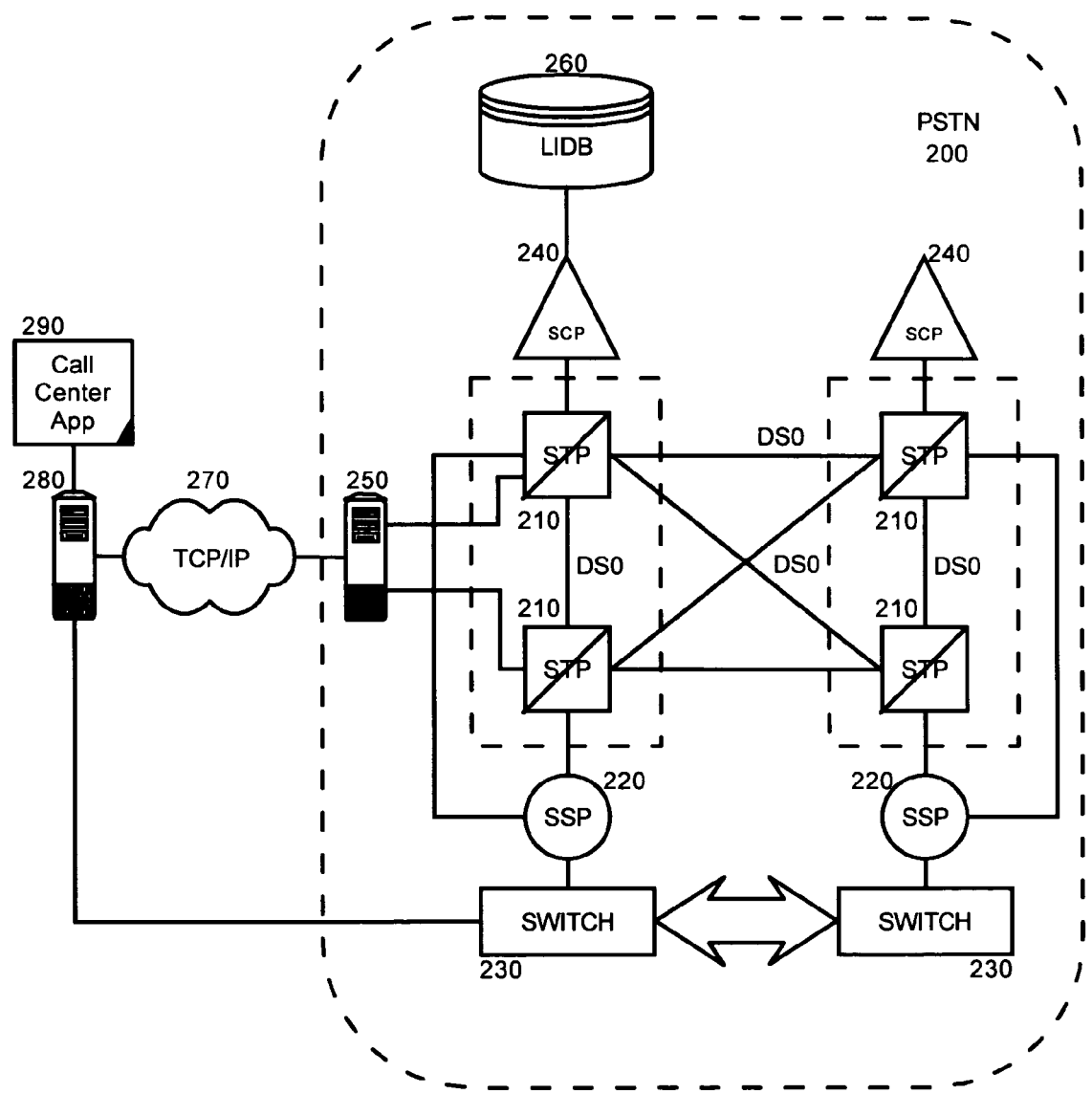
FIG. 2 is a schematic illustration of a system for managing call center data based upon a searching key disposed within an LIDB in a PSTN; and, FIG. 3 is a flow chart illustrating a call center process for utilizing a searching key disposed within an LIDB in the system of FIG. 2.

Importantly, a system for managing call center data based upon a searching key disposed within an LIDB in a PSTN can facilitate the foregoing methodology. In this regard, FIG. 2 is a schematic illustration of a preferred arrangement of the system. The system can include one or more telephonic switches 230 coupled to one another within a PSTN 200. Each of the switches 230 can be communicatively linked to a service switching point (SSP) 220 coupled to an out-of-band signaling network comprised of a multiplicity of STPs 210. Each STP 210 can be cross-connected to other ones of the STPs 210 in the PSTN so as to form an inter-network of switched communications links to support out-of-band signaling as is well-known in the art.

One or more switchless nodes each referred to as an SCP 240 can be communicatively linked to the out-of-band signaling network via one of the STPs 210 as is well-known in the art. Also, the SCP 240 can be coupled to a LIDB 260. The LIDB 260 can be configured to store invariant data such as the name, address and billing information for callers. The invariant data also can include a searching key into a call center application 290 in a call center 280 disposed within a data communications network 270. The LIDB 260 further can be configured to store variable data defined externally to the PSTN 200 and written to the LIDB 260 through an interface to the LIDB 260 via the SCP 240.

Each set of invariant and variable data for a caller can be stored in an amorphous record in the LIDB 260 which itself can be nothing more than a database such as a flat file database, an object database or a relational database. In any event, through the communicative linkages between the SCP 240, the STP 210 and the LIDB 260, transaction capabilities application part (TCAP) messages can be processed in the SCP 240 to access the invariant data in the LIDB 260. In this way, calls processed through the switch 230 can access logic in the SCP 240 and data in the LIDB 260 through the SSP 220.

Notably, a gateway node 250 can be coupled to the out-of-band network comprised of inter-connected STPs 210 to access data and logic through the SCP 240 through an exchange of messages such as TCAP messages. As a gateway, the gateway node 250 can include an interface to the PSTN 200 and an interface to a data communications network 270 such as an Internet Protocol (IP) driven network. In this way, data received through the PSTN 200, and more particularly from accessing the LIDB 260 in the PSTN 200 can be passed within IP packets to the call center 280 over the data communications network 270. Also, as the call center 280 can include telephonic handsets coupled to a switch 230 within the PSTN 200, LIDB 260 invariant and variable data regarding an incoming call can be processed within the call center 280 before the call can be established between the caller and the call center 280.

Figure 3:
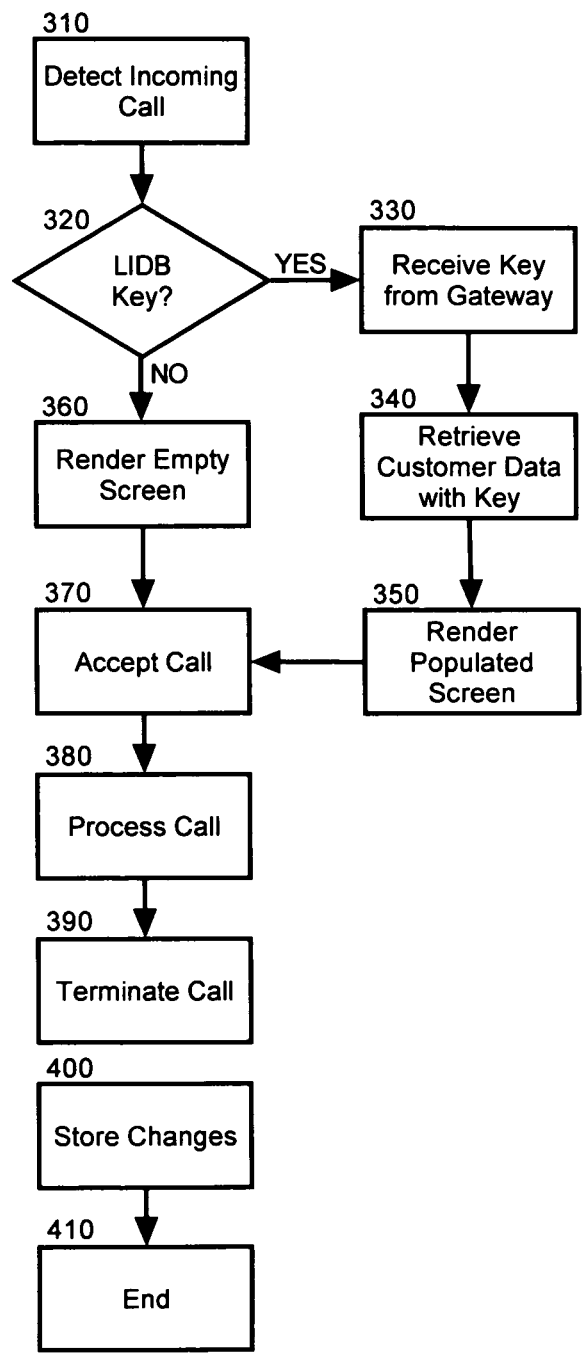

In operation, then, a searching key within the LIDB 260 associated with a caller into the call center 280 can be provided to the call center 280 before the call can be completed by way of the gateway node 250. Using the searching key, a record in the call center application 290 associated with the caller can be retrieved and rendered for use within the call center 280 as the call is established. In further illustration, FIG. 3 is a flow chart illustrating a call center process for utilizing a searching key disposed within an LIDB in the system of FIG. 2. Beginning in block 310 the incoming call can be detected. Concurrently, in decision block 320 it can be determined whether gateway data is available through the gateway node. That is, within the PSTN a searching key from the LIDB associated with the calling party can be retrieved from the LIDB and provided to the gateway node for delivery to the call center before the call center accepts the call.

If a searching key can be retrieved from the gateway node, in block 330 the searching key can be received from the gateway node and in block 340 the searching key can be used to retrieve customer data in a coupled call center application. Once retrieved, the customer data can be used to populate the fields of a screen in the customer application. By comparison, if a searching key cannot be retrieved from the gateway node, in block 360 an empty customer screen can be rendered in the customer application. In either case, in block 370 the call can be accepted and in block 380 the call can be processed before the call can be terminated in block 390. Optionally, the searching key can be used to further route the call to another handset in the call center, for instance to fulfill load balancing or service level agreement obligations. Finally, in block 400 any changes made to the customer screen can be persisted in the call center application before the process can end in block 410. Additionally, to the extent necessary, variable data such as a new searching key can be written to the LIDB via the gateway node.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods. It is to be understood that a computer program product can be incorporated into a machine readable storage device. The machine readable storage device is further understood to exclude transitory media, such as transitory signals and other propagation media.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A call center comprising:
    at least one phone handset coupled to a gateway to a public switched telephone network (PSTN);
    an enterprise application associated with said at least one handset and at least one data terminal coupled to said enterprise application and disposed in proximity to each of said at least one handset;
    a database of caller information coupled to said enterprise application, each record in said database having a configuration for location based upon a searching key;
    at least one line information database (LIDB) coupled to a service control point (SCP) and disposed in said PSTN and configured to store individual searching keys, each of said individual searching keys having an association with a corresponding subscriber to said PSTN, the SCP providing in interface to write data to the LIDB;
    a gateway node communicatively linked both to said PSTN and said enterprise application; and,
    a query interface to said enterprise application programmed to select records in said database of caller information based upon an individual searching key received from said LIDB through said gateway node.

2. The call center of claim 1, wherein each of said individual searching keys comprises a combination of a caller name and a caller address.

3. The call center of claim 1, wherein said enterprise application comprises a customer relationship management application.

4. A method for processing a call in a call center using information stored in a line information database (LIDB), the method comprising the steps of:
    retrieving a searching key from the LIDB associated with the call, the LIDB being disposed in a public switched telephone network (PSTN) and coupled to a service control point (SCP) providing an interface to the write data to the LIDB;
    querying an enterprise application based upon said retrieved searching key to retrieve caller data; and,
    presenting said caller data to a call center operator processing the call.

5. The method of claim 4, wherein said retrieving step comprises the step of retrieving said searching key from a gateway node disposed intermediately between the LIDB in a public switched telephone network (PSTN) and said enterprise application.

6. The method of claim 5, wherein said retrieving step further comprises the steps of:
    retrieving a combined name and address associated with the call from said gateway node; and,
    passing said combined name and address to said querying step as said retrieved searching key.

7. The method of claim 4, further comprising the step of presenting an incomplete set of caller data where said searching key cannot be retrieved from the LIDB.

8. The method of claim 4, further comprising the step of routing the call to a particular operator based upon said retrieved searching key.

9. In a public switched telephone network (PSTN), a method for processing a call in a call center using information stored in a line information database (LIDB), the method comprising the steps of:
    for selected ones of subscribers to the PSTN, storing within subscriber records in the LIDB a searching key into an enterprise application disposed externally to the PSTN, the LIDB being disposed in the PSTN and coupled to a service control point (SCP) providing an interface to the write data to the LIDB; and,
    during an attempt to establish a call between a subscriber to the PSTN and the call center, retrieving from the LIDB a searching key corresponding to the subscriber and forwarding said searching key to said enterprise application for use in retrieving call information stored externally to the PSTN.

10. The method of claim 9, wherein said forwarding step comprises the step of forwarding said searching key to said enterprise application via a gateway node coupled both to said enterprise application and the PSTN.

11. A machine readable storage device having stored thereon a computer program for processing a call in a call center using information stored in a line information database (LIDB), the computer program comprising a routine set of instructions which when executed by the machine cause the machine to perform the steps of:

retrieving a searching key from the LIDB associated with the call, the LIDB being disposed in a public switched telephone network (PSTN) and coupled to a service control point (SCP) providing an interface to the write data to the LIDB;

querying an enterprise application based upon said retrieved searching key to retrieve caller data; and, presenting said caller data to a call center operator processing the call.

12. The machine readable storage device of claim 11, wherein said retrieving step comprises the step of retrieving said searching key from a gateway node disposed intermediately between the LIDB in a public switched telephone network (PSTN) and said enterprise application.

13. The machine readable storage device of claim 12, wherein said retrieving step further comprises the steps of:

retrieving a combined name and address associated with the call from said gateway node; and, passing said combined name and address to said querying step as said retrieved searching key.

14. The machine readable storage device of claim 11, further comprising the step of presenting an incomplete set of caller data where said searching key cannot be retrieved from the LIDB.

15. The machine readable storage device of claim 11, further comprising the step of routing the call to a particular operator based upon said retrieved searching key.

16. A machine readable storage device having stored thereon a computer program for processing a call in a call center using information stored in a line information database (LIDB) in a public switched telephone network (PSTN), the computer program comprising a routine set of instructions which when executed by the machine cause the machine to perform the steps of:

for selected ones of subscribers to the PSTN, storing within subscriber records in the LIDB a searching key into an enterprise application disposed externally to the PSTN, the LIDB being disposed in the PSTN and coupled to a service control point (SCP) providing an interface to the write data to the LIDB; and, during an attempt to establish a call between a subscriber to the PSTN and the call center, retrieving from the LIDB a searching key corresponding to the subscriber and forwarding said searching key to said enterprise application for use in retrieving call information stored externally to the PSTN.

17. The machine readable storage device of claim 16, wherein said forwarding step comprises the step of forwarding said searching key to said enterprise application via a gateway node coupled both to said enterprise application and the PSTN.

* * * * *